US007710072B2

(12) United States Patent  (10) Patent No.: US 7,710,072 B2
Ibrahim  (45) Date of Patent: May 4, 2010

(54) DISCHARGE CIRCUIT

(75) Inventor: Randolph A. Ibrahim, Sedalia, CO (US)

(73) Assignee: Nexergy, Inc., Centennial, CO (US)

(*) Notice: Subject to any disclaimer, the term of this patent is extended or adjusted under 35 U.S.C. 154(b) by 605 days.

(21) Appl. No.: 11/326,765

(22) Filed: Jan. 6, 2006

(65) Prior Publication Data

US 2006/0176020 A1  Aug. 10, 2006

Related U.S. Application Data

(60) Provisional application No. 60/642,211, filed on Jan. 6, 2005.

(51) Int. Cl.
*H02J 7/00* (2006.01)
(52) U.S. Cl. ............................. 320/127; 320/131
(58) Field of Classification Search .......... 324/426, 324/427; 320/127, 131; 307/64, 66
See application file for complete search history.

(56) References Cited

U.S. PATENT DOCUMENTS

| 4,445,523 A | 5/1984 | Bruning et al. |
| 4,553,081 A | 11/1985 | Koenck |
| 4,709,202 A | 11/1987 | Koenck et al. |
| 4,992,720 A | 2/1991 | Hata |
| 5,153,496 A | 10/1992 | LaForge |
| 5,164,653 A | 11/1992 | Reem |
| 5,583,440 A * | 12/1996 | Bisher ........................ 324/426 |
| 5,796,239 A | 8/1998 | van Phuoc et al. |
| 6,075,340 A | 6/2000 | Koenck |
| 6,456,035 B1 | 9/2002 | Crisp et al. |
| 6,583,601 B2 | 6/2003 | Simoes et al. |
| 6,605,926 B2 | 8/2003 | Crisp et al. |
| 6,683,439 B2 | 1/2004 | Takano et al. |
| 6,771,042 B2 | 8/2004 | Chen et al. |
| 6,937,947 B2 | 8/2005 | Trembley |
| 2003/0222622 A1 | 12/2003 | Franke |
| 2004/0155628 A1 | 8/2004 | Liscio et al. |
| 2005/0248313 A1 | 11/2005 | Thorland |

FOREIGN PATENT DOCUMENTS

JP  02193534 A  * 7/1990

* cited by examiner

*Primary Examiner*—Bao Q Vu
*Assistant Examiner*—Jue Zhang
(74) *Attorney, Agent, or Firm*—Townsend and Townsend and Crew LLP

(57) ABSTRACT

According to the invention, an apparatus for robust battery discharge which provides uninterrupted power to a discharge circuit used in a discharge cycle is disclosed. The apparatus may have a discharge circuit for discharging a battery. The discharge circuit may be adapted to be coupled with a discharge load and configured to discharge the battery using the discharge load during a discharging cycle. The apparatus may have a first power input and a second power input, which may configured to receive power from a first power source and a second power source, respectively. The power inputs may be further configured to supply power to the discharge circuit. The apparatus may have a power switching circuit for switching power from the first power source to the second power source when the first power source is interrupted. The second power source may be the battery.

22 Claims, 10 Drawing Sheets

DISCHARGE CIRCUIT

PRIORITY CLAIM

This application claims priority to Provisional U.S. Patent Application No. 60/642,211, filed Jan. 6, 2005, entitled "Charging System" The entire disclosure of U.S. Patent Application No. 60/642,211 is hereby incorporated by reference as if fully set forth herein.

BACKGROUND OF THE INVENTION

Discharge circuits are commonly used in battery charging, conditioning, calibration and other systems. In battery charging and conditioning systems, discharge circuits may be used to completely discharge a battery before beginning a charging cycle. For some battery types, such as nickel-cadmium batteries, they may have a "memory" of previous minimum charge levels such that shallow cycling can limit battery life. A discharge circuit is used in a battery charging system for such a battery to ensure such batteries last longer by deeply cycling the battery.

In battery calibration systems, a discharge circuit may be used to determine the characteristics of a battery. For some battery types, such as lithium-ion batteries, determining the characteristics of the battery under load conditions may assist in determining battery condition as it ages. Additionally, calibration systems produce information that allow predicting performance of the battery over its service life.

Discharge or calibration cycles may require extended periods of time without interruption to be effective. If the cycle is interrupted, the battery may have to be recharged before the cycle can begin anew, consuming even more time. Failure of the discharge circuit, power loss to the discharge circuit, or disconnecting of the battery from the circuit are all possible causes of interruption of the cycle.

Figure 1A:
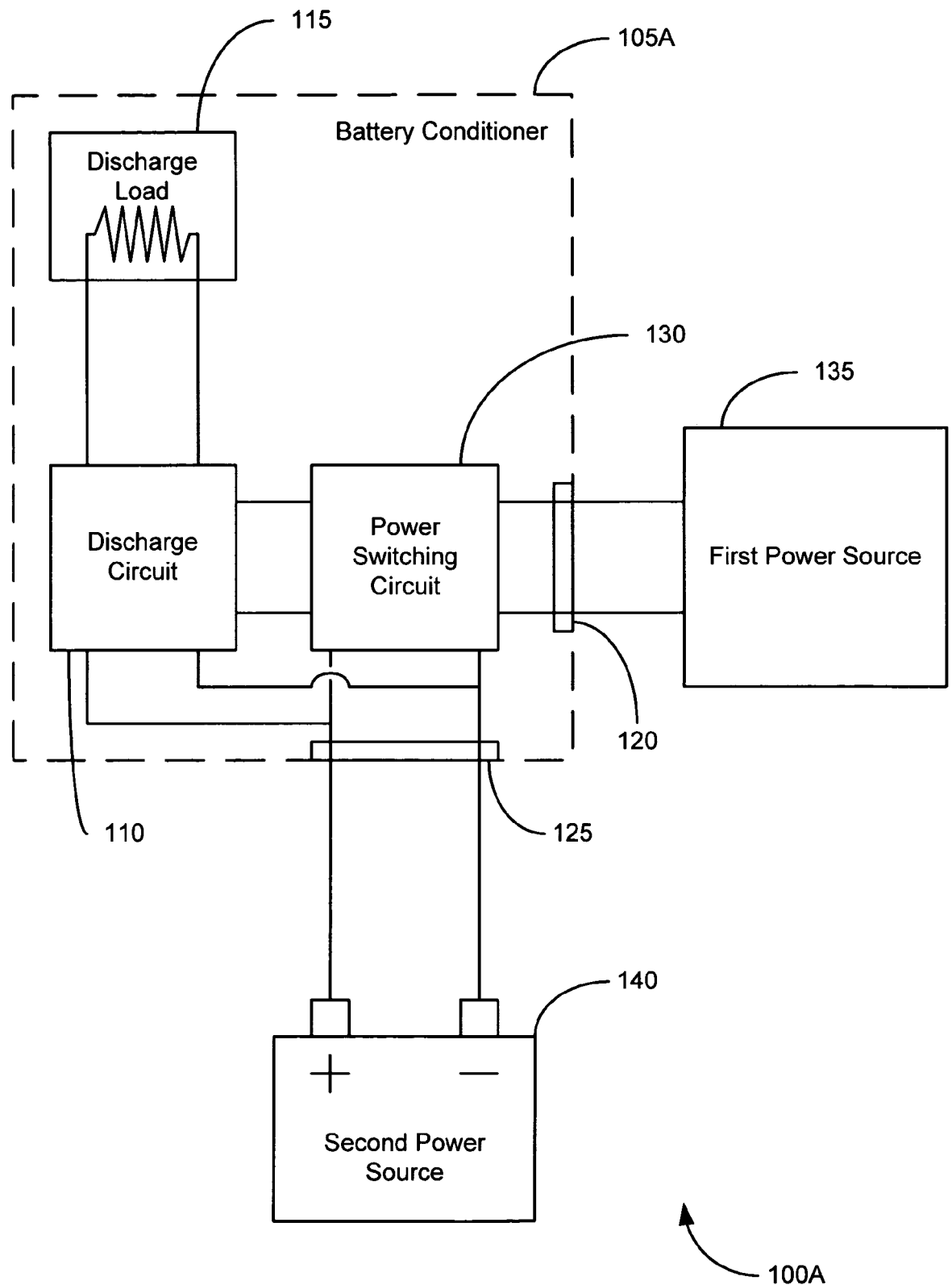
FIG. 1A is a block diagram of an apparatus for robust battery discharging using a constant discharge load and a first and second power source.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter suffix.

DETAILED DESCRIPTION OF THE PREFERRED EMBODIMENTS

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, an apparatus for robust battery discharge is described that provides uninterrupted power to a discharge circuit used in a discharge cycle. The apparatus may have a discharge circuit for discharging a battery, which may be adapted to be coupled with a discharge load. The discharge load may be one or more resistive elements.

In some embodiments, the discharge load may be at least a portion of the operating load of the battery, which is the load powered by the battery during normal operation outside the discharge cycle. Merely by way of example, if the load powered by the battery during normal operation is a flashlight bulb, the flashlight bulb may be the discharge load in such an embodiment. The discharge circuit may be configured to discharge the battery using the discharge load during the discharging cycle. Energy from the battery in these embodiments may be consumed by the discharge load, increasing the discharge rate of the battery.

The apparatus may have a first power input, which may be configured to receive power from a first power source and further configured to supply power to the discharge circuit. The first power source may be powered by alternating-current, such as that supplied to a rectifier/transformer device which produces direct-current power. The first power source may also be powered by direct current, such as that supplied by a battery. The apparatus may also have a second power input, which may be configured to receive power from a second power source and further configured to supply power to the discharge circuit. The second power source may be the battery being discharged by the discharge circuit. One or both of the power inputs, in some embodiments, may merely be connectors for conductive elements which may carry electrical current. In other embodiments, one or both of the power inputs may be power supply devices known in the art, which may possibly regulate and monitor power.

The apparatus may also have a power switching circuit for switching power from the first power source to the second power source. The power switching circuit may, when the first power source is interrupted, switch power from the first power source to the second power source.

In some embodiments, when power is switched to the second power source, the resistance of the discharge load may be reduced. In embodiments where the battery is the second power source, the resistance of the discharge load may be reduced so that battery power is conserved to operate the discharge circuit for longer periods of time, should the power interruption in the first power source continue for such an extended period of time. Various algorithms for determining how much to reduce the resistance of the discharge load are possible within the scope of the invention. In some embodiments, the discharge load may be reduced to a predefined resistance when power is switched to the second source. In other embodiments, the resistance of the discharge load may be reduced proportionally in relation to the charge remaining in the battery. In still other embodiments the load may be stepped down incrementally in relation to the charge remaining in the battery.

In some embodiments, the apparatus may switch power from the second power source to the first power source when the first power source is no longer interrupted. In yet other embodiments, the power switching circuit may wait a specified time after the first power source is no longer interrupted before switching power from the second power source to the first power source. Waiting for a specified time after the first power source is no longer interrupted may ensure that power is not switched back to the first power source only to be switched back to the second power source, should the disappearance of the interruption in the first source only be momentary or otherwise of a short duration.

In some embodiments, the power switching circuit may store and analyze characteristics of power interruptions in the first power source to assist in determining how long to wait before switching power back to the first power source from the second power source. For example, in one possible scenario, the power switching circuit may determine after multiple power interruptions in the first power source that when power returns to the first power source, the power is likely to be interrupted again, at least momentarily within the first minute of the power returning. After making such a determination, the power switching circuit in this example may wait for two minutes after a power interruption in the first power source ceases before switching power back to the first power source.

In other embodiments, the apparatus may also have a shut-down circuit configured to shut down the discharge circuit based, at least in part, on the discharge level of the battery. In some instances, the discharge cycle performed by the discharge circuit may be complete (i.e. the discharge level of the battery is at a proper level) and so a shut down is necessary and desirable. In other instances, the discharge circuit may determine that the power provided by the second power source will soon be inadequate to continue powering the discharge circuit, and shut down the discharge circuit. Power provided by the second power source may be inadequate when it reaches low enough levels to cause undesired or unexpected operation of the discharge circuit. Power may also be inadequate if it will not allow the discharge circuit to complete the discharge cycle. In such circumstances, it may be more desirable to shut down the discharge circuit in an orderly manner rather than allow it to shut down unexpectedly due to inadequate power from the second power source. Any shut downs may possibly consist of storing data related to the discharge cycle, and will be discussed in more detail below.

In other embodiments, the shut-down circuit may shut down the discharge circuit based, at least in part, on the length of time the power is switched to the second power source. In these embodiments, the shut down circuit may determine, based on the length of time that power is switched to the second power source, that the interruption of power is likely to be at least longer than the period of time the second power source may be able to provide power to the discharging circuit.

In some embodiments, the apparatus may also have a data storage circuit configured to store data related to the discharge cycle. The data storage circuit may store data related to the discharge cycle such as temperature of the battery, discharge cycle time, level of discharge and/or other characteristics and measurements. The data storage circuit may be coupled to data acquisition devices such as sensors to retrieve such data. The data acquired by the data storage circuit may be stored on a data store, which may, merely by way of example, be physically located in or on the apparatus, the battery, or elsewhere.

In another embodiment of the invention, a method for robust battery discharging which provides uninterrupted power to a discharge circuit used in a discharge cycle is provided. The method may discharge a battery using a circuit, where the circuit is adapted to be coupled with a discharge load, and the circuit may be configured to discharge the battery using the discharge load during a discharge cycle.

The method may power a discharge circuit from a first power source at a first instance in time. The method may also react to an interruption of power in the first power source. When reacting to the interruption of power in the first power source, the method may configure the discharge circuit to use power from a second power source. The method may also power the discharge circuit from the second power source at a second instance in time. The second power source may be the battery and may be different than the first power source. In some embodiments, the first instance in time may be before the second instance in time. In these and other embodiments, the method may also reduce the resistance of the discharge load when the discharge circuit is powered from the second power source.

In some embodiments, the method may react to the first power source no longer being interrupted. When the interruption ends, the method may configure the circuit to use power from the first power source once again. Switching back to the first power source may occur at a third instance in time.

In some embodiments, the method may shut down the circuit, based at least in part, on the discharge level of the battery power source. In other embodiments, the method may shut down the circuit, based at least in part, on the length of time the circuit is powered by the second power source. In some embodiments, the method may further store data related to the discharge cycle, for example, calibration parameters.

In another embodiment of the invention, a machine-readable medium having machine-executable instructions for robust battery discharging which provides uninterrupted power to a discharge circuit used in a discharge cycle is provided. The machine-executable instructions may have instructions for discharging a battery using a circuit, where the circuit is adapted to be coupled with a discharge load, and the circuit is further configured to discharge the battery using the discharge load during a discharge cycle.

The machine-executable instructions may also have instructions for powering the circuit from a first power source at a first instance in time. There may be instructions for reacting to an interruption of power in the first power source. The instructions for reacting to the interruption of power in the first power source may have instructions for configuring the circuit to use power from the second power source. There may be further instructions for powering the circuit from the second power source at a second instance in time. The second power source may be the battery and may be different than the first power source.

The machine-executable instructions may also have instructions for reacting to the first power no longer being interrupted. Instructions for reacting to the return of the first power source may have instructions for configuring the circuit to use power from the first power source once again. There may further be instructions for powering the circuit from the first power source at a third instance of time. The machine-executable instructions may also have instructions for storing data related to the discharge cycle.

Turning now to FIG. 1A, a block diagram 100A of a battery conditioner 105A of one embodiment of the invention is shown. In this embodiment, the battery conditioner 105A is shown having a discharge circuit 110, a discharge load 115, a first power input 120, a second power input 125, and a power switching circuit 130. In some embodiments, the discharge load 115 may be external to, and not an integral part of, the battery conditioner 105A. In FIG. 1A the discharge load 115 is shown as being a constant load. Also shown on FIG. 1A is a first power source 135 and a second power source 140, the second power source 140 being shown in FIG. 1A as a battery.

In FIG. 1A, the discharge circuit 110 is coupled to the discharge load 115 and may be configured to discharge the second power source 140 using the discharge load 115. The first power input 120 is configured to receive power from the first power source 135 and further configured to supply power to the discharge circuit 110. The second power input 125 is configured to receive power from the second power source 140 and further configured to supply power to the discharge circuit 110. The power switching circuit 130 may be configured to switch power from the first power source 135 to the second power source 140 and/or from the second power source 140 to the first power source 135.

An exemplary discharge cycle, using the embodiment of the invention shown in FIG. 1A, may begin with power being supplied from the first power source 135 to the discharge circuit 110. The discharge circuit 110, which is also coupled to the second power source 140, may discharge the second power source 140 using the discharge load 115. At some point during the discharge cycle, the first power source 135 may be interrupted unexpectedly. Reacting to this interruption, the power switching circuit 130 may switch power from first power source 135 to the second power source 140. At this point in the discharge cycle, the discharge circuit 110 may be powered by the second power source 140 while discharging through the load 115 at the same time.

At some point in time, the first power source 135 may no longer be interrupted. The power switching circuit 130 may react to this condition and switch power back to the first power source 135 from the second power source 140. After the switch-back, the first power source supplies power to the discharge circuit 110 and the second power source 140 supplies power to the discharge load. However, if the interruption of the first power source 135 does continue, the discharge circuit 110 may continue to be powered by second power source 140 and discharge the second power source 140 through the discharge load 115. In this way, the battery power source 140 serves as an uninterruptible power supply for the battery conditioner 105 when the first power source fails 135.

Figure 1B:
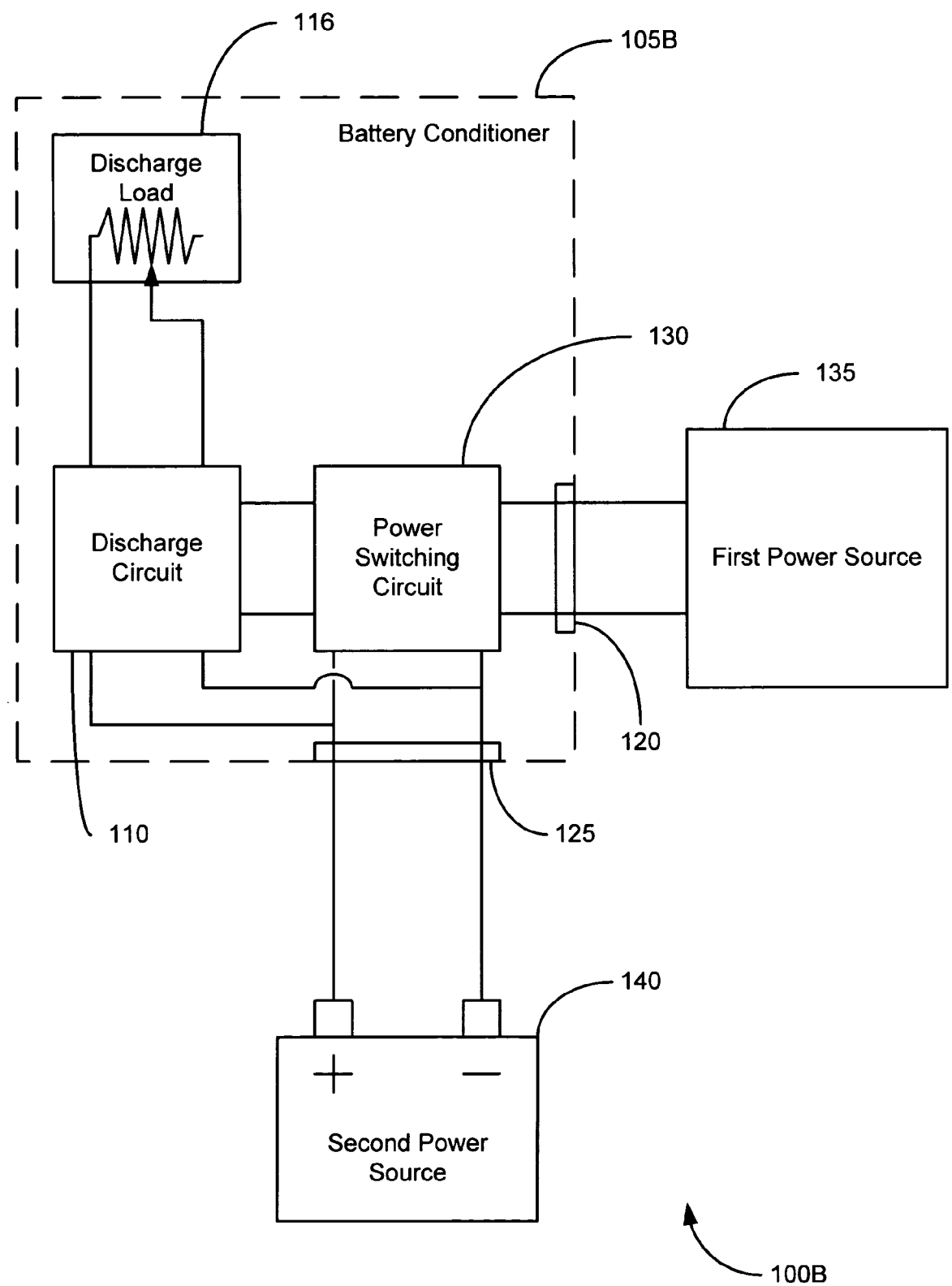
FIG. 1B is a block diagram of an apparatus, similar to the apparatus in FIG. 1A, except using a variable discharge load.

FIG. 1B shows a block diagram 100B of another embodiment of the battery conditioner 105B, similar to the battery conditioner 105A in FIG. 1A, except using a variable discharge load 116. In some embodiments, the variable discharge load 116 may be configured at a first resistance or load when the discharge circuit 110 is being powered by the first power source 135, and configured at a second, possibly lower, resistance when the discharge circuit 110 is being powered by the second power source or battery 140. In one embodiment, the battery conditioner 105A may be able to operate the discharge circuit 110 for longer periods of time during an extended interruption in the first power source 135 because the second power source 140 can discharge more slowly when the variable discharge load 116 is configured at a higher resistance.

Figure 1C:
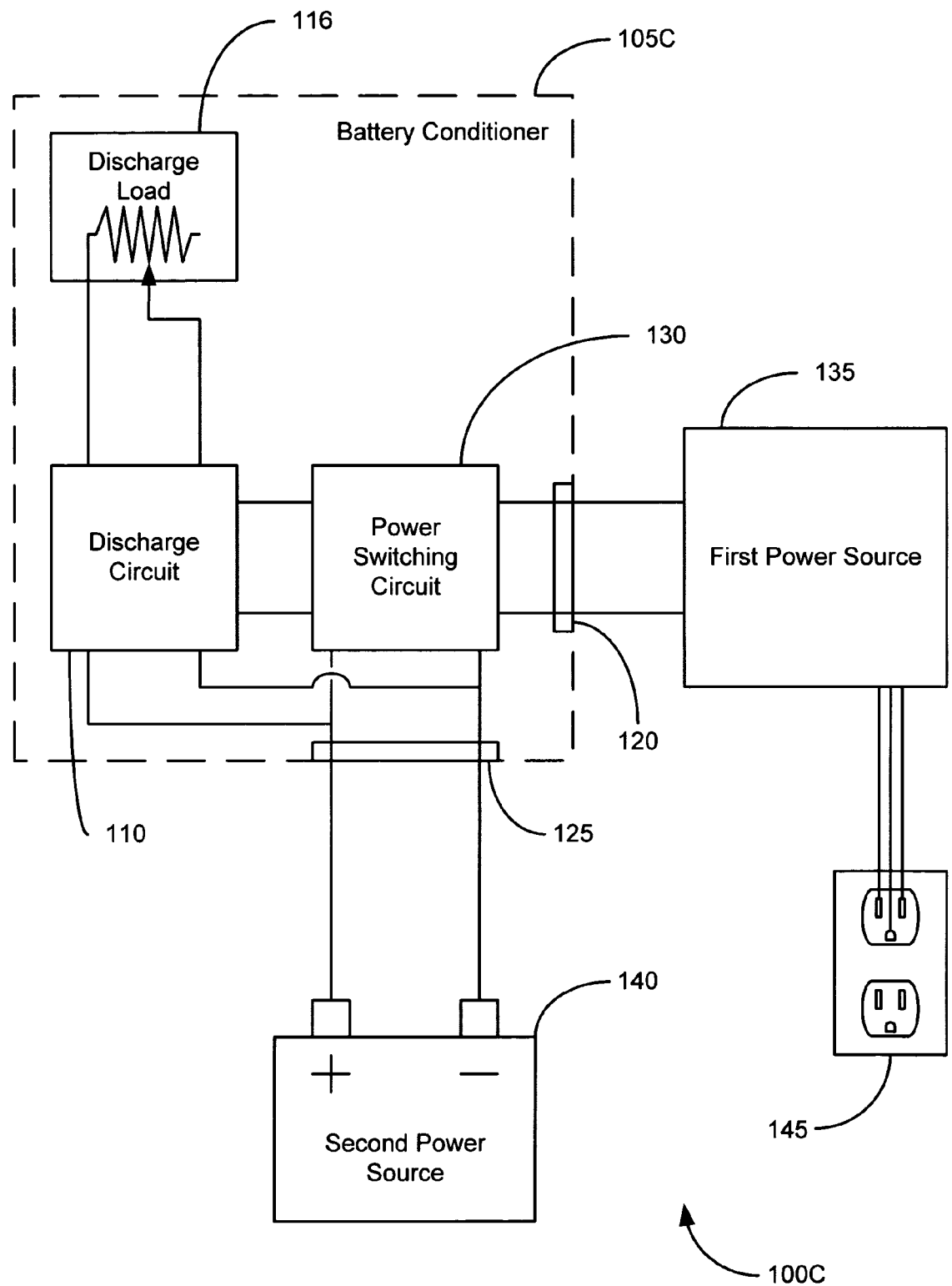
FIG. 1C is a block diagram of an apparatus, similar to the apparatus in FIG. 1B, where the first power source is powered by an alternating-current source.

FIG. 1C shows a block diagram 100C of another embodiment of the battery conditioner 105C, similar to the battery conditioner 105B in FIG. 1B, except also showing the first power source 135 being powered by alternating-current main power. In this particular embodiment, the alternating-current source 145 is shown as a standard 120-nominal-volt single phase wall outlet. Other alternating-current sources 145 are possible within the scope of the invention, including, but not limited to, 240-nominal-volt outlets (single and three phase), 480-nominal-volt outlets (single and three phase) and/or generators. In other embodiments which do not power the first power source 135 with an alternating-current source 145, the first power source 135 might, merely by way of example, be another battery or a DC power supply.

Figure 1D:
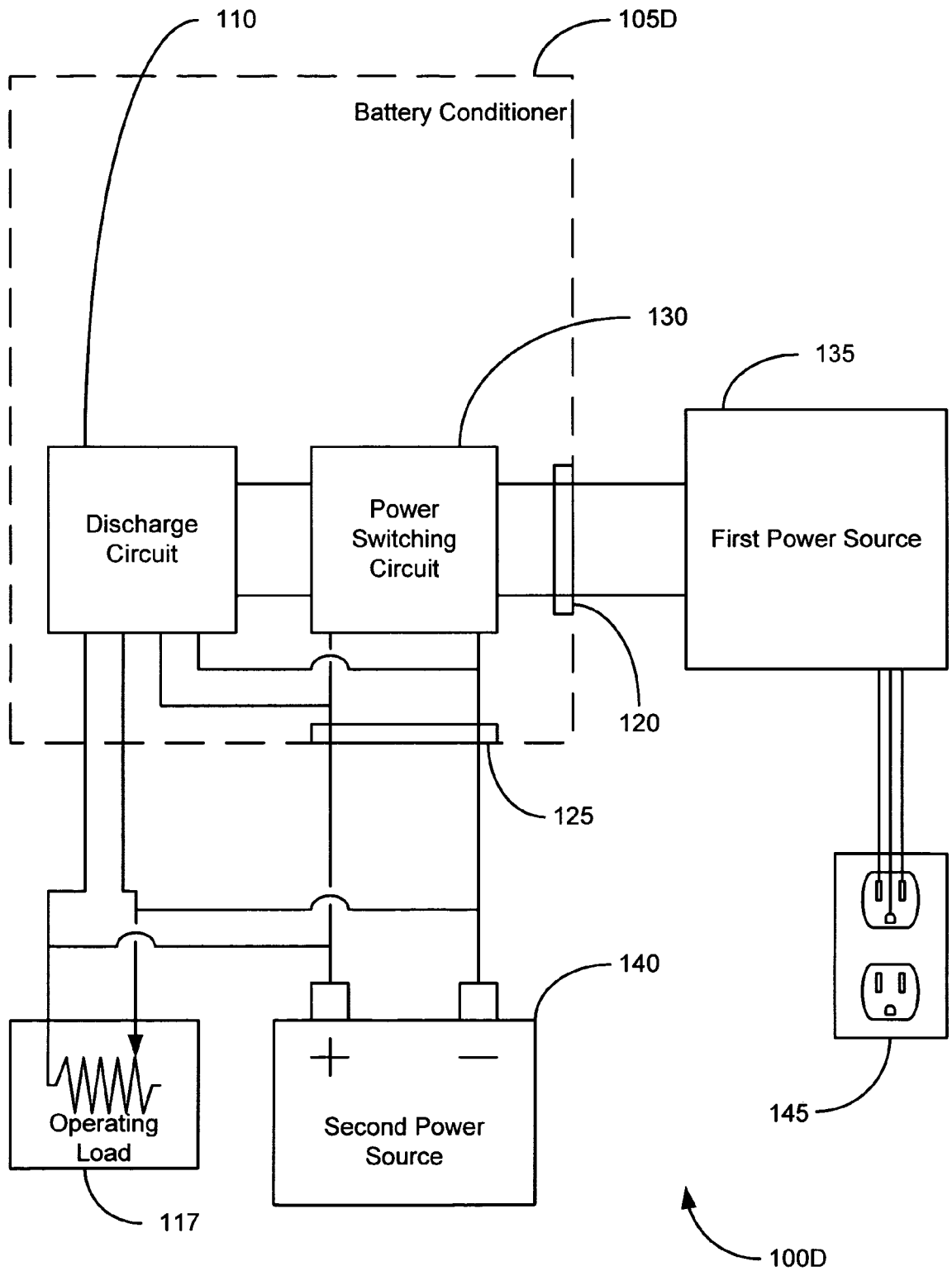
FIG. 1D is a block diagram of an apparatus, similar to the apparatus of FIG. 1C, where at least a part of an operating load is used as the discharge load.

FIG. 1D shows a block diagram 100D of another embodiment of the battery conditioner 105D, similar to the battery conditioner 105C in FIG. 1C, except using the operating load 117 of the second power source 140 as the discharge load for the discharge circuit 110. As is also shown on FIG. 1D, in some embodiments, only a portion of the operating load 117 may be used as the discharge load by the discharge circuit 110. The operating load 117 may, in some embodiments, provide physical terminals for coupling the discharge circuit 110 to the portion of the operating load 117 that is acceptable to use as a discharge load 110.

For instance, in an example embodiment, the operating load 117 may be a flashlight with a light bulb and an audible emergency beacon accessory circuit. Under normal operating conditions (i.e., outside the discharge cycle), the second power source 140 may power both the light bulb and the audible emergency beacon accessory circuit. However, the flashlight may have physical terminals for coupling the discharge circuit 110 to the light bulb, but not the audible emergency beacon circuit. In this way, only a portion of the operating load 117 is used for the discharge load used by the discharge circuit 110. In such an example, it might be disadvantageous to activate the audible emergency beacon by using the beacon circuit as a discharge load, whereas using the light bulb as the discharge load may be acceptable. Other configurations which use either an entirety of the operating load 117, or merely a portion of the operating load 117 as the discharge load, are possible within the scope of the invention.

Figure 1E:
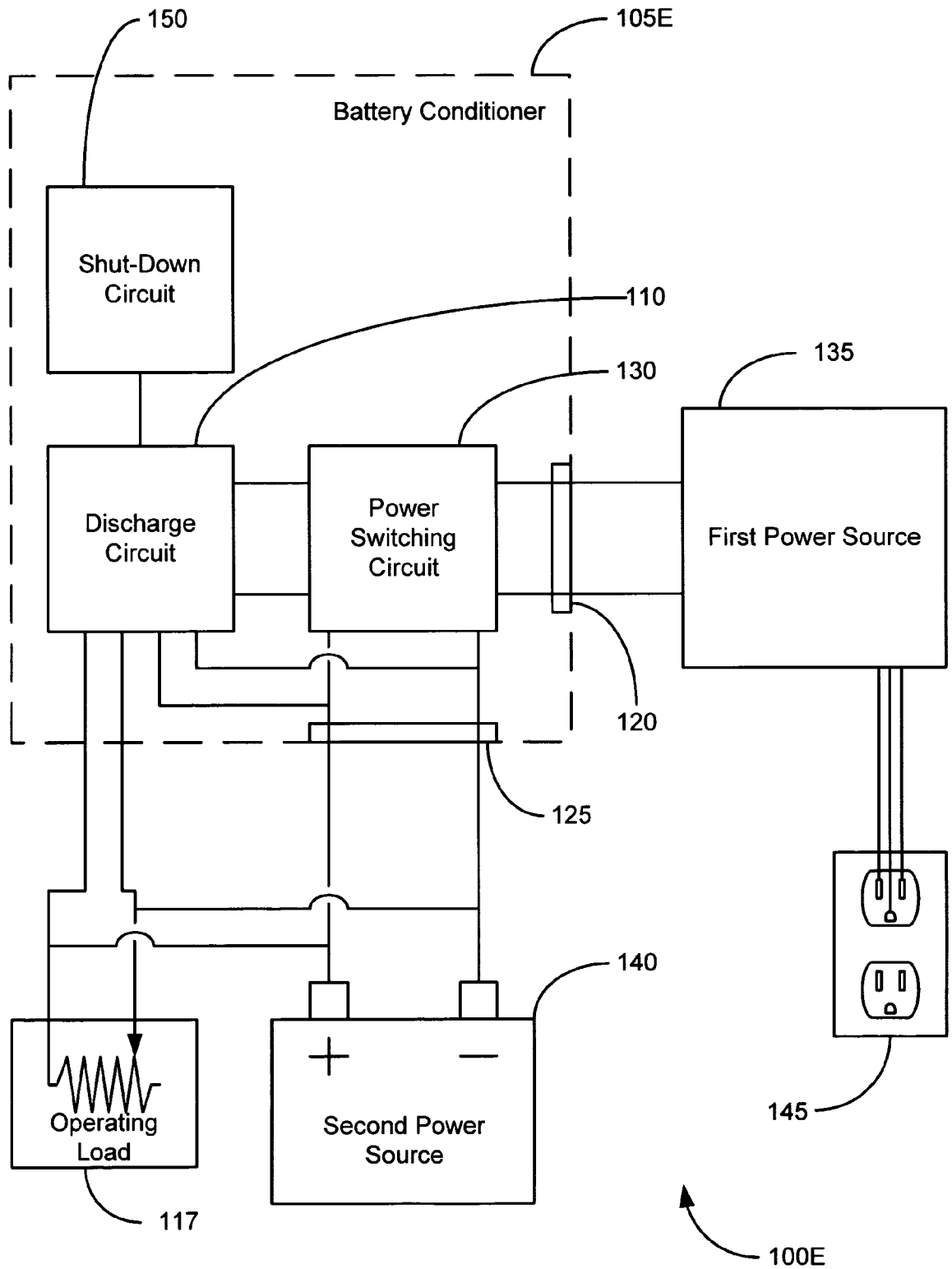
FIG. 1E is a block diagram of an apparatus, similar to the apparatus of FIG. 1D, which also has a shut-down circuit.

FIG. 1E shows a block diagram 100E of still another embodiment of the battery conditioner 105E, similar to the battery conditioner 105D in FIG. 1D, except also showing the battery conditioner 105E having a shut-down circuit 150. The shut-down circuit 150 may, in some embodiments, react to operational conditions and shut down the discharge circuit 110 when the discharge cycle completes. Typically, the battery 140 would be charged by a charging circuit (not shown) after shut-down of the discharge circuit 110.

For instance, at some point in time, the discharge circuit 110 may complete the discharge cycle and the shut-down circuit 150 may shut down the discharge circuit 110. The shut-down circuit 110 may determine that the discharge cycle is complete, merely by way of example, by monitoring the level of discharge of the second power source 140. Alternatively, the shut down circuit 150 may shut down the discharge circuit 110 before the discharge cycle is complete if the second power source 140 is no longer able to supply enough power to run the discharge circuit 110. This may occur when too little power can be supplied from the second power source 140, or when the shut-down circuit 150 anticipates that the power supplied from the second power source 140 may become too low at some point in the future. In one embodiment, the shut-down circuit 150 may anticipate that the power supplied from the second power source 140 may become too low by the discharge characteristics of the second power source 140 or merely by the amount of time the discharge circuit 110 has been powered by the second power source 140.

Figure 1F:
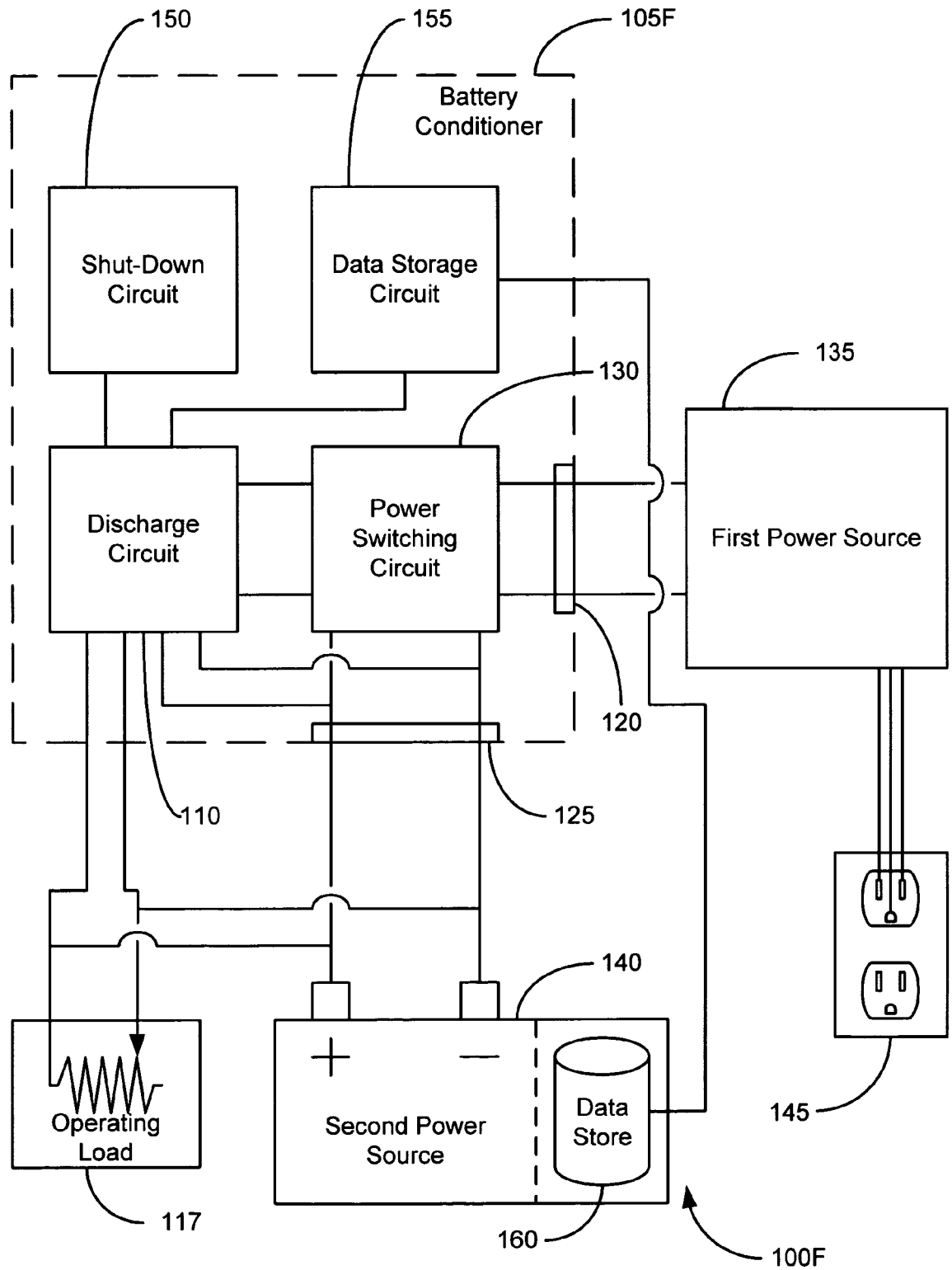
FIG. 1F is a block diagram of an apparatus, similar to the apparatus of FIG. 1E, which also has a data storage circuit and data store physically integrated with the battery.

FIG. 1F shows a block diagram 100F of yet another embodiment of the battery conditioner 105F, similar to the battery conditioner 105E in FIG. 1E, except also showing a data storage circuit 155 in communication with the discharge circuit 110 and a data store 160, which is shown being physically integrated with the second power source 140. The data storage circuit 155 may acquire data related to the discharge cycle, possibly from the discharge circuit 110 or the second power source 140, and store this information on the data store 160. The data store 160 is a machine-readable medium and may be one of many types of data storage devices known in the art, including, but not limited to, magnetic drives and/or flash memory. The discharge circuit 110 may use data stored on the data store 160 to conduct future discharge cycles, whether those cycles be part of normal operation or during conditioning. The data storage circuit 155 may store data on the data store 160 related to both fully-completed discharge cycles and discharge cycles that are shut down prematurely as discussed above. Additionally, parameters determined during conditioning and/or discharge can be stored on the data store 160 such that another device coupled to the battery 140 can read out the parameters.

Figure 2A:
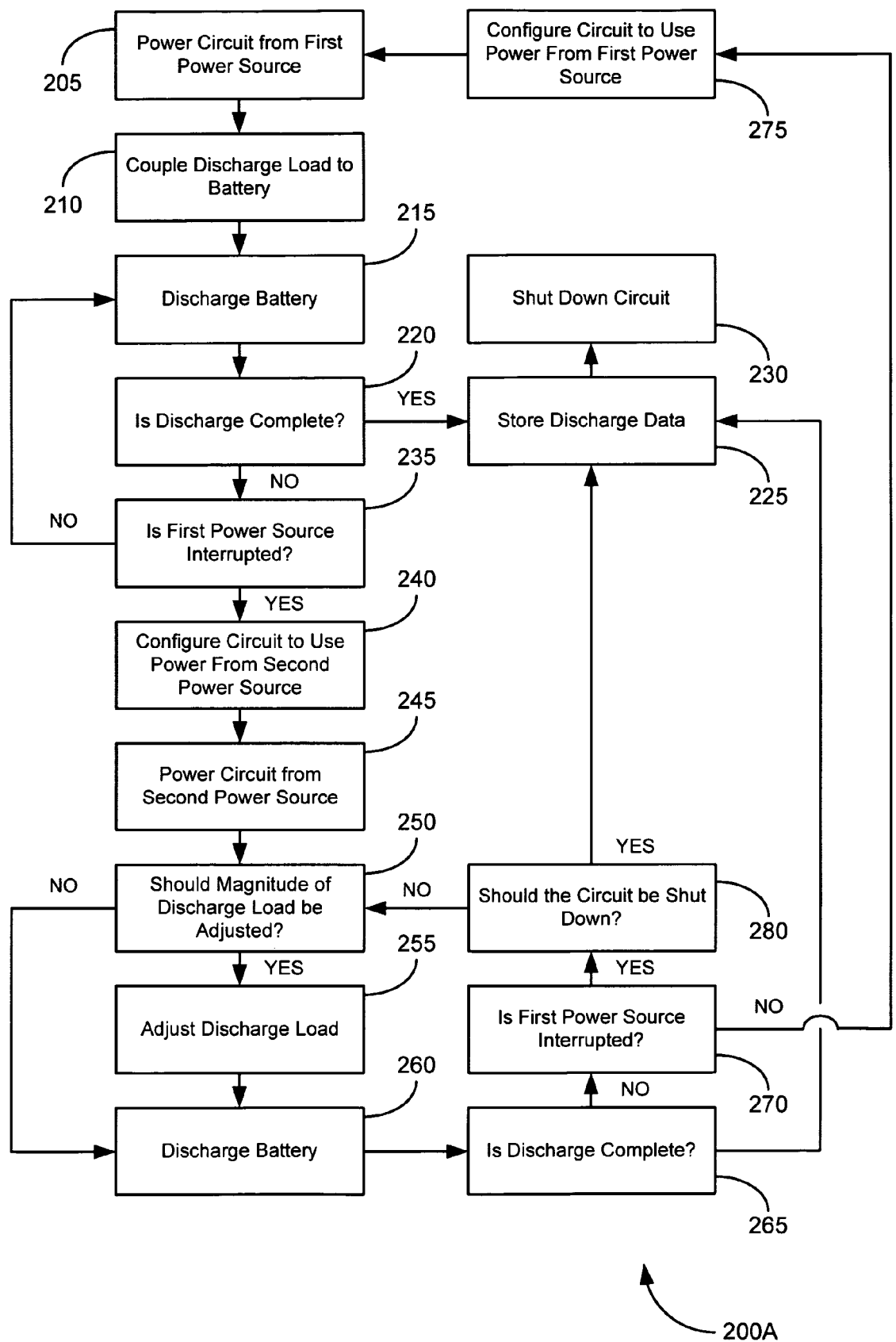
FIG. 2A is a flow diagram of a method for robust battery discharging that may adjust a discharge load and store discharge cycle data.

FIG. 2A shows a flow diagram 200A of a method for robust battery discharging that may adjust a discharge load and store data in the battery. At block 205, the method may provide power to a discharge circuit 110 from a first power source 135. At block 210, the method may couple a discharge load 115 to a battery 140. At block 215, the method may discharge the battery 140 using the discharge load 115. The method may continue to discharge the battery until it is determined that discharge is complete at block 220. If the discharge is complete, the method may store parametric data related to the discharge cycle at block 225, and shut down the discharge circuit at block 230 in preparation for charging the battery 140. If the discharge is not complete, the method may continue to discharge the battery by looping back to step 215. If the first power source is interrupted, the method may react at block 235 and configure the discharge circuit 110 at block 240 to use power from a second power source which is the battery 140. The method may then power the discharge circuit 110 from the battery 140 at block 245.

At block 250 the method may determine whether to adjust the resistance of the discharge load 115. The method may determine whether to adjust the resistance of the discharge load 115 based on a number of factors, including, but not limited to: the circuit being powered from the second power source; the discharge level of the battery; and/or the length of time the circuit has been powered from the second power source. The resistance of the discharge load 115 may then be adjusted at block 255, and the method may continue to discharge the battery with the discharge load at block 260. At block 265, the method will determine if the discharge cycle is complete. If the discharge is complete, the method will store discharge data at block 225 and shut down the discharge circuit at block 230. Processing may be performed to analyze data gathered in the discharge before storing processed parameters in the data store 160.

If the method determines at block 270, while the circuit is powered from the second power source 140, that the first power source 135 is no longer interrupted, the method will configure the discharge circuit 110 to use power from the first power source 135 at block 275. If the first power source 135 remains interrupted, the method will continue to discharge the battery 140. The method will also continue to check if the discharge cycle should be shut down at block 280. The method may determine that the discharge cycle should be shut down based on a number of factors, including, but not limited to: whether the discharge level of the battery is at a level where the discharge cycle is complete; whether the discharge level of the battery is such that the battery may not have enough power to power the circuit within some period of time, and/or the length of time the circuit has been powered by the battery. If the method determines at block 280 that the circuit should be shut down, the method will store data related to the discharge cycle at block 225 and shut down the circuit at block 230.

If the method determines as block 280 that the discharge circuit 110 should not be shut down, the method may again determine if the resistance of the discharge load should be adjusted at block 250 and repeat a portion of the method as described above until the discharge circuit 110 is shut down at block 230.

Figure 2B:
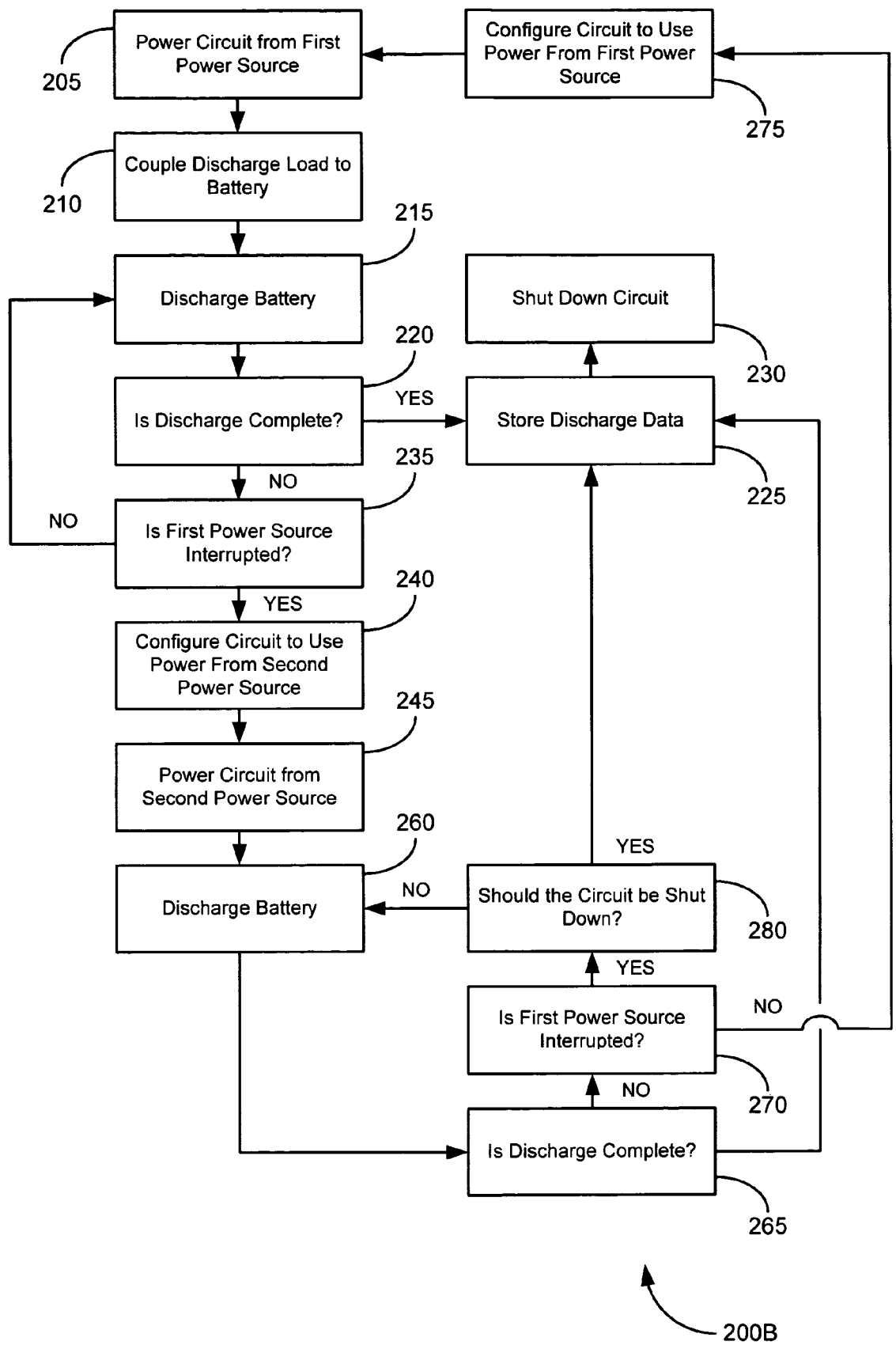
FIG. 2B is a flow diagram of a method, similar to the method in FIG. 2A, which does not adjust the discharge load.
Figure 2C:
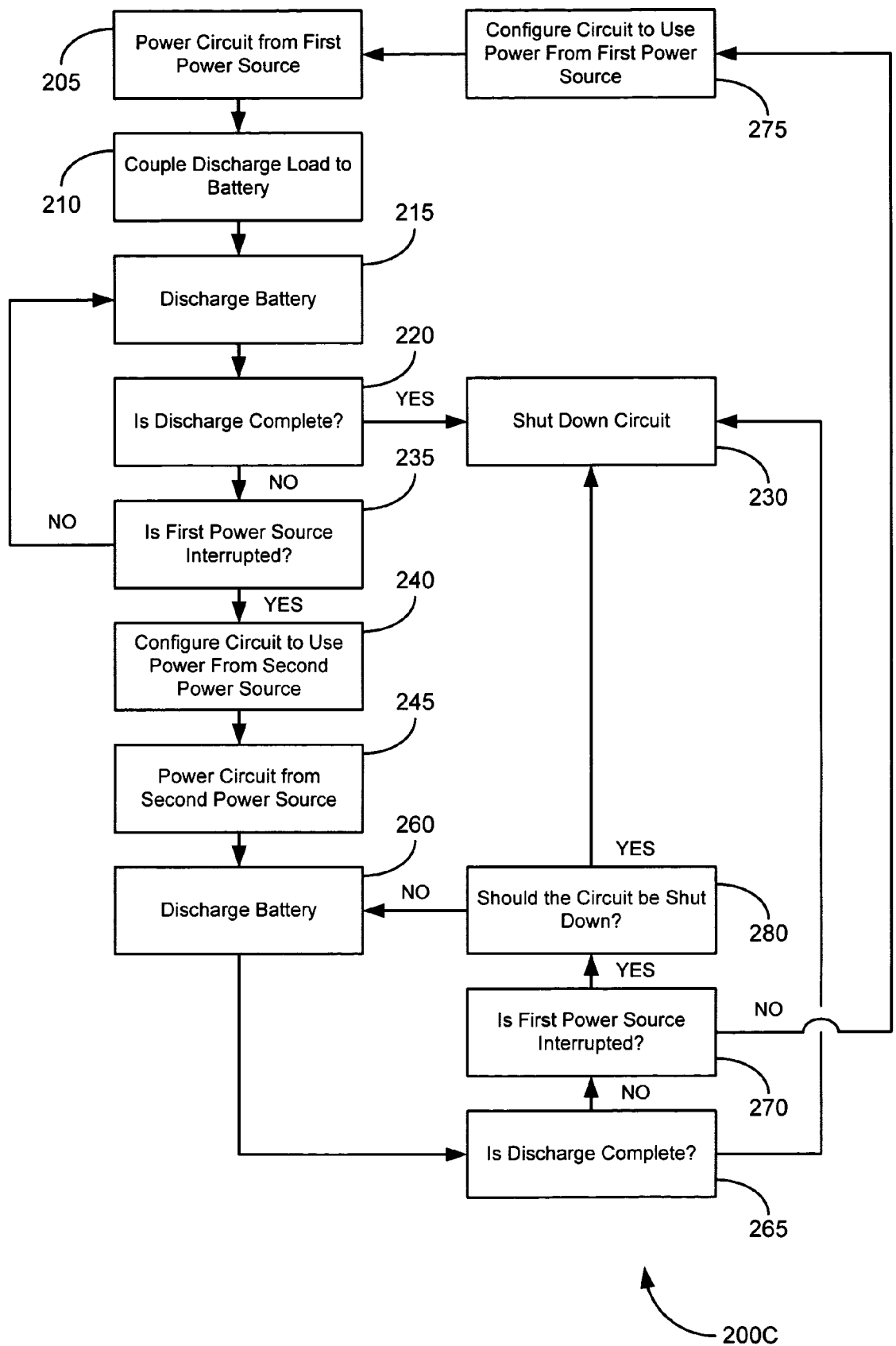
FIG. 2C is a flow diagram of a method, similar to the method in FIG. 2B, which does not store discharge cycle data.

FIG. 2B shows a flow diagram 200B of another method of the invention, similar to the method shown in FIG. 2A, except in this embodiment the method does not adjust the resistance of the discharge load. FIG. 2C shows a flow diagram 200C of another method of the invention, similar to the method shown in FIG. 2B, except in this embodiment the method does not store data related to the discharge cycle.

Figure 3:
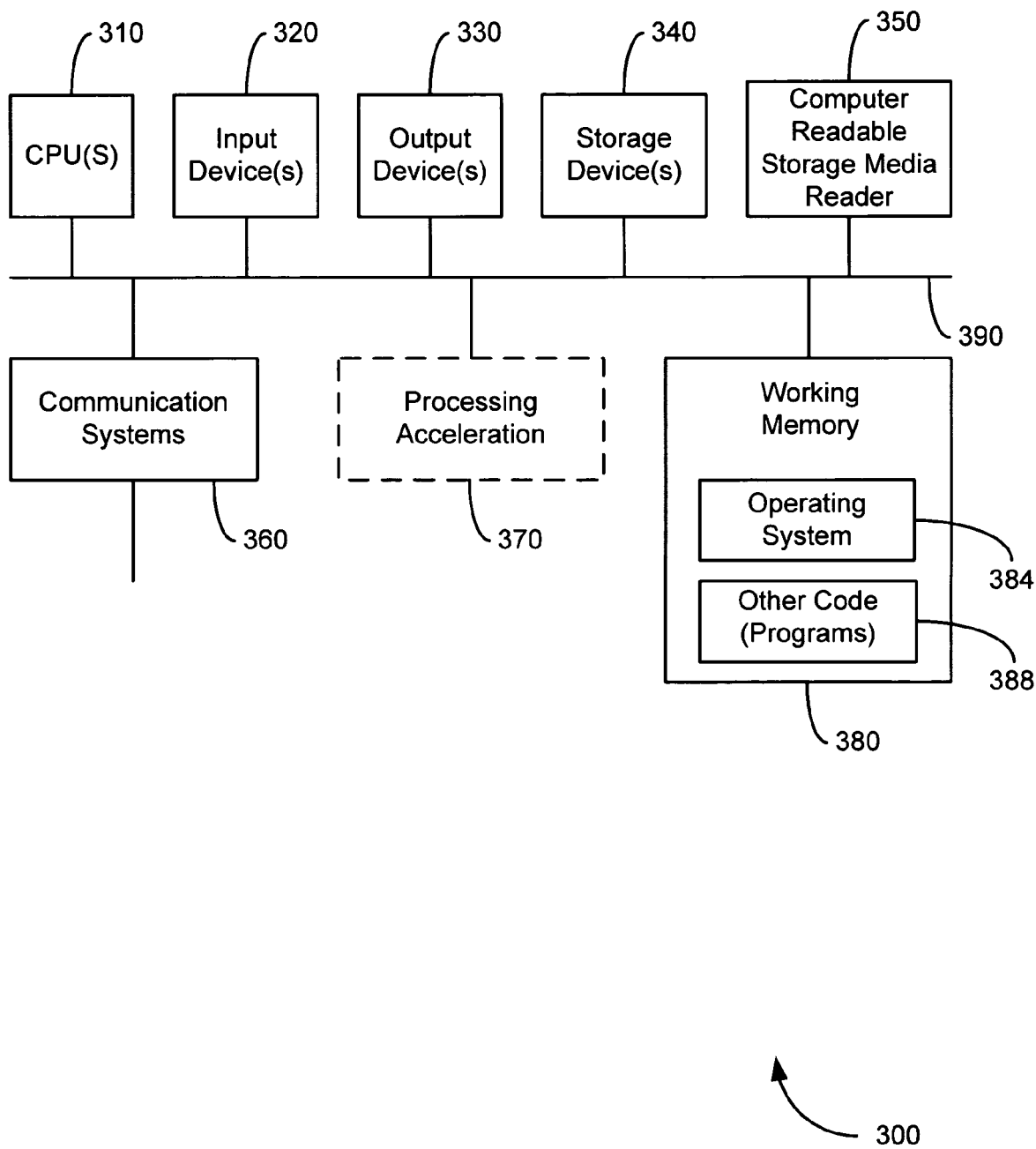
FIG. 3 is a block diagram of an exemplary computer system capable of being used in at least some portion of the apparatuses of the present invention, or implementing at least some portion of the methods of the present invention.

FIG. 3 is a block diagram illustrating an exemplary computer system in which embodiments of the present invention may be implemented. This example illustrates a computer system 300 such as may be used, in whole, in part, or with various modifications, to provide the functions of the discharging circuit, the power switching circuit, the shut-down circuit, the data storage circuit, the data store and/or other components of the invention such as those discussed above. Various functions of the battery conditioner 105 may be controlled by the computer system, for example, switching between various power inputs, performing the discharge cycle, storing parameters from conditioning, performing a charge of the battery, etc.

The computer system 300 is shown comprising hardware elements that may be electrically coupled via a bus 390. The hardware elements may include one or more central processing units (CPUs) 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, etc.), and working memory 380, which may include RAM and ROM devices as described above. In some embodiments, the computer system 300 may also include a processing acceleration unit 370, which can include a DSP, a special-purpose processor and/or the like.

The computer-readable storage media reader 350 can further be connected to a computer-readable storage medium, together (and, optionally, in combination with storage device (s) 340) comprehensively representing remote, local, fixed, and/or removable storage devices plus storage media for temporarily and/or more permanently containing computer-readable information. The communications system 360 may permit data to be exchanged with a network and/or any other computer described above with respect to the system 300.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code 388 for implementing any or all of the function of the various elements of the architecture as described herein. For example, software, stored on and/or executed by a computer system such as system 300, can provide the functions of the discharging circuit, the power switching circuit, the shut-down circuit, the data storage circuit, the data store and/or other components of the invention. Methods implementable by software on some of these components have been discussed above in more detail.

A number of variations and modifications of the disclosed embodiments can also be used. For example, some of the embodiments discuss powering the discharge circuit from the battery during a main power interruption, but other embodiments could power additional circuitry of the battery conditioner. A processor of the battery conditioner, for example, could be powered during main power interruption.

The invention has now been described in detail for the purposes of clarity and understanding. However, it will be appreciated that certain changes and modifications may be practiced within the scope of the appended claims.

What is claimed is:

1. A battery conditioning apparatus for robust battery discharge which provides uninterrupted power to a battery conditioning control circuit used in a discharge cycle, the apparatus comprising:
    a battery conditioning control circuit that controls the discharging of a battery through a discharge load for discharging the battery, wherein:
        the battery conditioning control circuit is adapted to be coupled with the discharge load; and
        the battery conditioning control circuit is configured to substantially discharge the battery using the discharge load during a discharging cycle controlled by the battery conditioning control circuit;
    a first power input, wherein:
        the first power input is configured to receive power from a first power source; and
        the first power input is further configured to supply power to operate the battery conditioning control circuit;
    a second power input, wherein:
        the second power input is configured to receive power from a second power source; and
        the second power input is further configured to supply power to operate the battery conditioning control circuit; and
    a power switching circuit for switching power from the first power source to the second power source, wherein:
        when the first power source is interrupted, the power switching circuit switches power from the first power source to the second power source; and
        the second power source comprises the battery.

2. The battery conditioning apparatus for robust battery discharge which provides uninterrupted power to a battery conditioning control circuit used in a discharge cycle as recited in claim 1, wherein the discharge load comprises at least one resistive element.

3. The battery conditioning apparatus for robust battery discharge which provides uninterrupted power to a battery conditioning control circuit used in a discharge cycle as recited in claim 1, wherein a load value of the discharge load is reduced when the power is switched to the second power source.

4. The battery conditioning apparatus for robust battery discharge which provides uninterrupted power to a battery conditioning control circuit used in a discharge cycle as recited in claim 1, wherein the first power source is powered by alternating-current.

5. The battery conditioning apparatus for robust battery discharge which provides uninterrupted power to a battery conditioning control circuit used in a discharge cycle as recited in claim 1, wherein the power switching circuit switches power from the second power source to the first power source when the first power source is no longer interrupted.

6. The battery conditioning apparatus for robust battery discharge which provides uninterrupted power to a batter2£ conditioning control circuit used in a discharge cycle as recited in claim 1, wherein:
  at least a portion of an operating load is also the discharge load; and
  the operating load is powered by the battery during normal operation outside of the discharge cycle.

7. The battery conditioning apparatus for robust battery discharge which provides uninterrupted power to a battery conditioning control circuit used in a discharge cycle as recited in claim 1, further comprising a shut-down circuit configured to shut down the battery conditioning control circuit based, at least in part, on a discharge level of the battery.

8. The battery conditioning apparatus for robust battery discharge which provides uninterrupted power to a battery conditioning control circuit used in a discharge cycle as recited in claim 1, further comprising a shut-down circuit configured to shut down the battery conditioning control circuit based, at least in part, on the length of time the power is switched to the second power source.

9. The battery conditioning apparatus for robust battery discharge which provides uninterrupted power to a battery conditioning control circuit used in a discharge cycle as recited in claim 1, further comprising a data storage circuit configured to store data related to the discharge cycle.

10. A method for robust battery conditioning which provides uninterrupted power to a battery conditioning control circuit used in a discharge cycle, the method comprising:
  discharging a battery using a battery conditioning control circuit, wherein:
  the battery conditioning control circuit is adapted to be coupled with a discharge load and to control the discharging of the battery through the discharge load; and
  the battery conditioning control circuit is configured to substantially completely discharge the battery using the discharge load during a discharge cycle controlled by the battery conditioning control circuit;
  powering the battery conditioning control circuit from a first power source at a first instance in time, wherein the first power source which is different from a second power source;
  reacting to an interruption of power in the first power source, wherein reacting to the interruption of power in the first power source comprises a step of:
  configuring the battery conditioning control circuit to use power from the second power source; and
  powering the battery conditioning control circuit from the second power source at a second instance in time, wherein the second power source comprises the battery.

11. The method for robust battery conditioning which provides uninterrupted power to a battery conditioning control circuit used in a discharge cycle as recited in claim 10, wherein the first instance in time is before the second instance in time.

12. The method for robust battery discharging conditioning which provides uninterrupted power to a battery discharge control, circuit used in a discharge cycle as recited in claim 10, the method further comprising reducing a load value of the discharge load when the battery conditioning control circuit is powered from the second power source.

13. The method for robust battery discharging conditioning which provides uninterrupted power to a battery conditioning control circuit used in a discharge cycle as recited in claim 10, file method further comprising:
  reacting to the interruption of power in the first power source no longer existing, wherein reacting to the interruption of power in the first power source no longer existing comprises:
  configuring the battery conditioning control circuit to use power from the first power source; and
  powering the battery conditioning control circuit from the first power source at a third instance in time.

14. The method for robust battery conditioning which provides uninterrupted power to a battery conditioning control circuit used in a discharge cycle as recited in claim 13, wherein the second instance in time is before the third instance in time.

15. The method for robust battery conditioning which provides uninterrupted power to a battery conditioning control circuit used in a discharge cycle as recited in claim 10, the method further comprising shutting down the battery conditioning control circuit based, at least in part, on the discharge level of the battery.

16. The method for robust battery conditioning which provides uninterrupted power to a battery conditioning control circuit used in a discharge cycle as recited in claim 10, the method further comprising shutting down the battery conditioning control circuit based, at least in part, on the length of time the battery conditioning control circuit is powered by the second power source.

17. The method for robust battery conditioning which provides uninterrupted power to a battery conditioning control circuit used in a discharge cycle as recited in claim 10, the method further comprising storing data related to the discharge cycle.

18. A machine-readable medium having machine-executable instructions for robust battery discharging conditioning which provides uninterrupted power to a battery conditioning control circuit used in a discharge cycle, wherein the machine-readable medium comprising machine-executable instructions for:
  discharging a battery using a battery conditioning control circuit, wherein:
  the battery conditioning control circuit is adapted to be coupled with a discharge load; and
  the battery conditioning control circuit is configured to discharge the battery using the discharge load during a discharge cycle, controlled by the battery conditioning control circuit, that substantially discharges the battery;
  powering the circuit from a first power source at a first instance in time, wherein the first power source which is different from a second power source;
  reacting to an interruption of power in the first power source, wherein reacting to the interruption of power in the first power source comprises a step of:
  configuring the battery conditioning control circuit to use power from the second power source; and
  powering the battery conditioning control circuit from the second power source at a second instance in time, wherein the second power source comprises the battery.

19. A machine-readable medium having machine-executable instructions for robust battery conditioning which provides uninterrupted power to a battery conditioning control circuit used in a discharge cycle, as recited in claim 18, wherein the machine-readable medium further comprise machine-executable instructions for:

reacting to the interruption of power in the first power source no longer existing, wherein reacting to the interruption of power in the first power source no longer existing comprises:

configuring the battery conditioning control circuit to use power from the first power source; and powering the battery conditioning control circuit from the first power source at a third instance in time.

20. A machine-readable medium having machine-executable instructions for robust battery-conditioning which provides uninterrupted power to a battery conditioning control circuit used in a discharge cycle, as recited in claim 18, wherein the machine-readable medium further comprises machine-executable instructions for:

storing data related to the discharge cycle.

21. The battery conditioning apparatus for robust battery discharge which provides uninterrupted power to a battery conditioning control circuit used in a discharge cycle as recited in claim 1, wherein the second power input comprises a connector for removably connecting the battery conditioning apparatus to the battery.

22. The method for robust battery conditioning which provides uninterrupted power to a battery conditioning control circuit used in a discharge cycle as recited in claim 10, further comprising removably connecting the battery to a battery conditioning apparatus that comprises the battery conditioning control circuit.

* * * * *